United States Patent [19]

Stephan

[11] Patent Number: 5,785,788
[45] Date of Patent: Jul. 28, 1998

[54] PROCESS FOR MANUFACTURING A STOWAGE CONTAINER FOR USE IN AN AIRCRAFT

[75] Inventor: Walter A. Stephan, St. Marein, Austria

[73] Assignee: Fischer Advanced Composite Components GmbH, Reid Im Innkreis, Austria

[21] Appl. No.: 497,314

[22] Filed: Jun. 30, 1995

Related U.S. Application Data

[63] Continuation-in-part of Ser. No. 23,898, Feb. 19, 1993, abandoned.

[30] Foreign Application Priority Data

Feb. 20, 1992 [AT] Austria ......................... 312/92

[51] Int. Cl.$^6$ .......................... B29C 45/00; B29C 53/40; B29C 65/02; B29C 69/00
[52] U.S. Cl. ................. 156/217; 156/222; 156/227; 156/245; 264/241; 264/250; 264/328.1; 264/510; 264/552; 264/554
[58] Field of Search ................. 264/241, 552, 264/554, 510, 250, 251, 328.1; 156/224, 211, 228, 217, 245, 206, 222, 227

[56] References Cited

U.S. PATENT DOCUMENTS

| | | | |
|---|---|---|---|
| 1,348,354 | 8/1920 | Garnett. | |
| 2,041,357 | 5/1936 | Kraft | 156/228 |
| 2,758,739 | 8/1956 | Burkholder | 156/224 |
| 2,849,758 | 9/1958 | Plumley et al. . | |
| 3,142,406 | 7/1964 | Kantor. | |
| 3,148,103 | 9/1964 | Gallagher | 156/224 |
| 3,801,402 | 4/1974 | Suter | 156/182 |
| 3,913,996 | 10/1975 | Benford. | |
| 4,010,865 | 3/1977 | Wilgus. | |
| 4,019,674 | 4/1977 | Ikelheimer et al. | 229/23 R |
| 4,266,670 | 5/1981 | Mykleby | 206/600 |
| 4,643,314 | 2/1987 | Kidd. | |
| 4,683,018 | 7/1987 | Sutcliffe et al. | 156/196 |
| 4,690,851 | 9/1987 | Auduc et al. . | |
| 4,700,862 | 10/1987 | Carter et al. . | |
| 4,712,710 | 12/1987 | Freeman et al. . | |

(List continued on next page.)

FOREIGN PATENT DOCUMENTS

| | | |
|---|---|---|
| A-0 271 118 | 6/1988 | European Pat. Off. . |
| A-0 293 320 | 11/1988 | European Pat. Off. . |
| A-2 563 153 | 10/1985 | France . |
| A-2 588 575 | 4/1987 | France . |
| A-2 646 247 | 12/1977 | Germany . |
| A-3 537 402 | 4/1986 | Germany . |

*Primary Examiner*—Richard Crispino
*Attorney, Agent, or Firm*—Ladas & Parry

[57] ABSTRACT

A process for the manufacture of an aircraft stowage container, comprising a bottom member A, a top member D, at least two side wall members B, C, and two plane end wall members 1. Said members are essentially rigid and plane. Additionally an essentially rigid closure flap member 3 may be provided. The process comprises the steps of preparing at least two layers of prepregs impregnated with a curable thermosettings for forming the top, bottom and side wall members or the U-shaped surround. Between at least two of said layers of prepregs 6 a honeycomb construction material 7 is interposed in a manner that several regions spaced apart from each other are defined by said honeycomb material thereby defining folding or bending regions. Then the layers of prepregs are bent or folded by applying them over a mould 5, and they are cured afterwards in an autoclave by heat application to a cured composite component 2. In this process mode the plane end wall members 1 are prepared separately and are connected with the cured composite component 2 to form the final stowage container. In another modification of the construction of the stowage container, in addition to the prepreg 6, separate prepregs are premanufactured as the plane end wall members 1. Said prepregs are applied to the mould 5 together with the prepreg 6 and all prepregs are cured together to form a unitary part of the cured composite component 2. In this case all wall members with the exception of the closure flap member 3 form an integral element.

21 Claims, 12 Drawing Sheets

U.S. PATENT DOCUMENTS

| | | |
|---|---|---|
| 4,781,243 | 11/1988 | De Vogel et al. . |
| 4,793,727 | 12/1988 | Schmaling . |
| 4,838,418 | 6/1989 | Teixeira . |
| 4,948,006 | 8/1990 | Okabe et al. ............................ 156/228 |
| 4,948,039 | 8/1990 | Amatangelo ............................ 229/198 |
| 5,108,048 | 4/1992 | Chang . |
| 5,133,476 | 7/1992 | Schutz . |

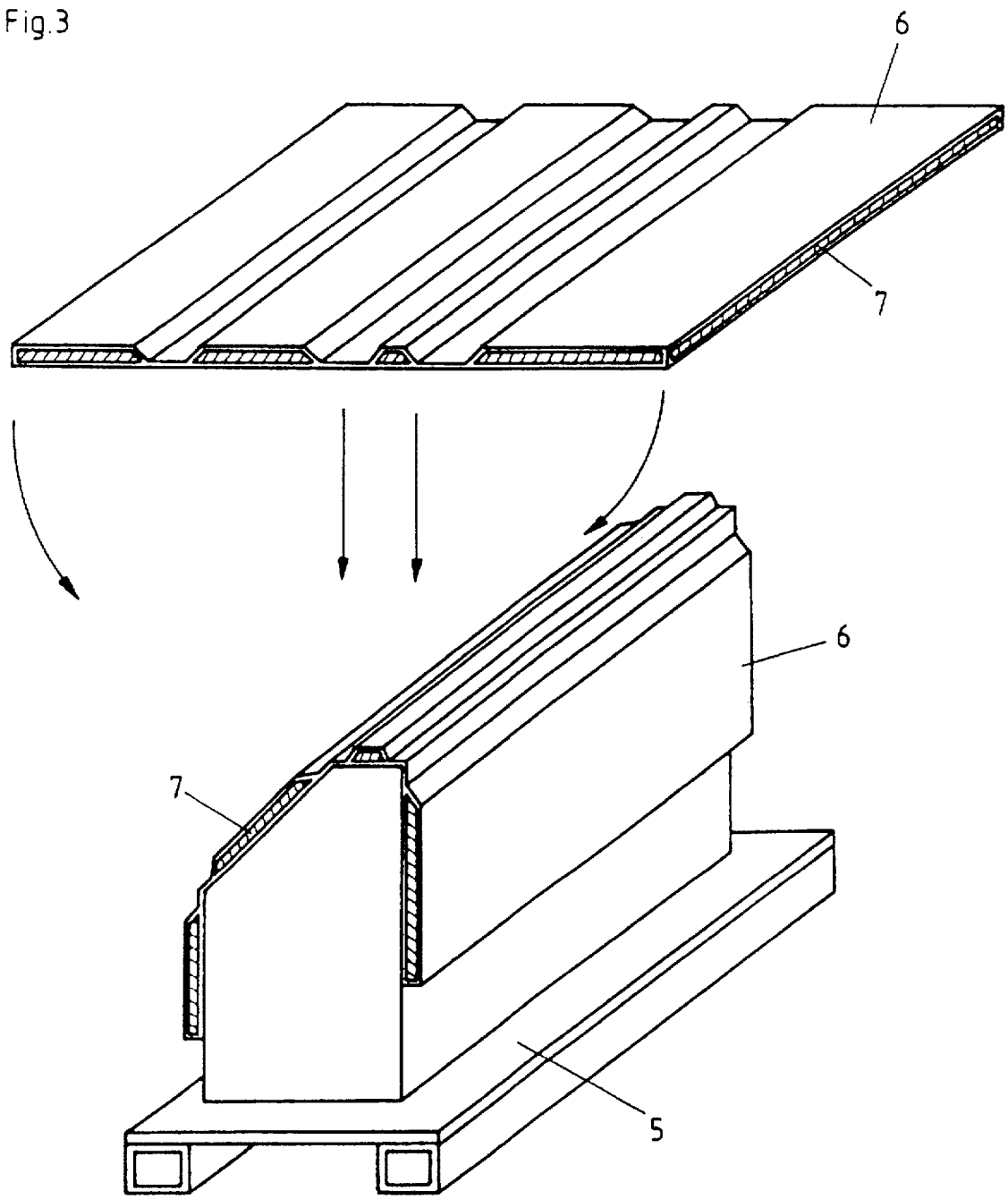

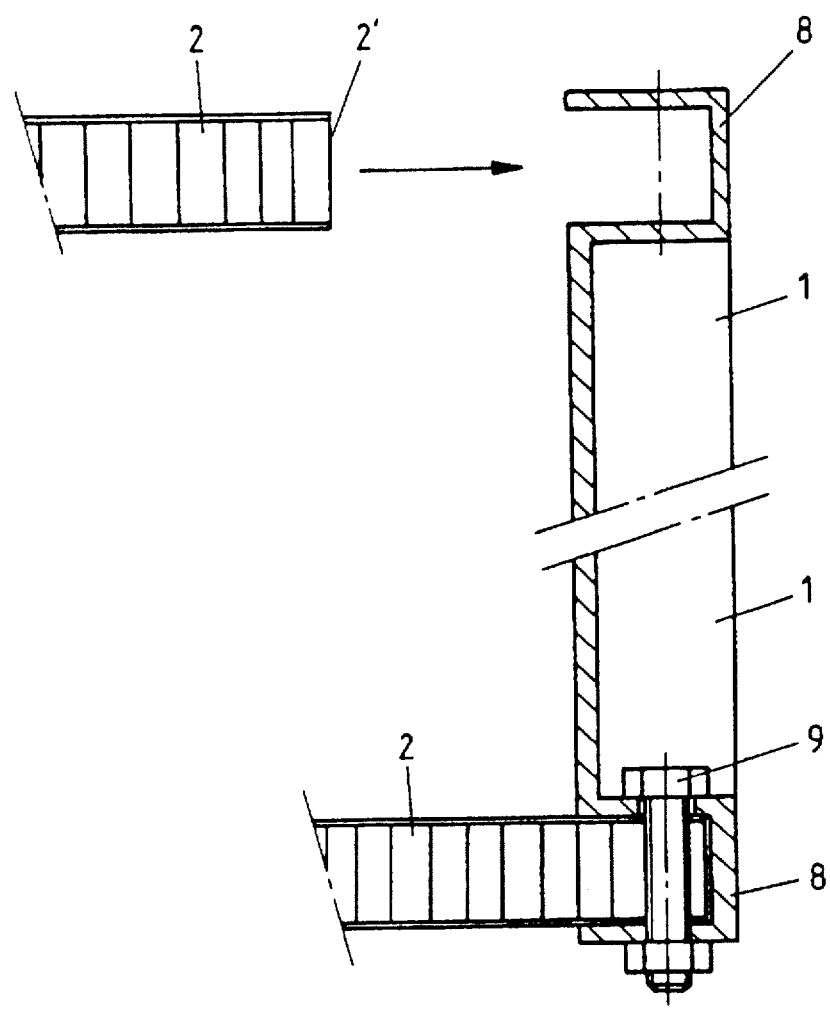

PROCESS FOR MANUFACTURING A STOWAGE CONTAINER FOR USE IN AN AIRCRAFT

CROSS REFERENCE TO RELATED APPLICATION

This application is a continuation-in-part of U.S. patent application Ser. No. 08/023,898, filed on Feb. 19, 1993, now abandoned.

BACKGROUND OF THE INVENTION AND PRIOR ART

The invention relates to a process for the manufacture of a stowage container for the use in aircraft, comprising a bottom member, a top member, at least two side wall members, and two plane end wall members, said members being essentially rigid and flat, and an essentially rigid closure flap member, all said members being assembled together and together defining the stowage space of the container, the end wall members being made of injection molded parts. The invention furthermore relates to a process for the manufacture of a stowage container comprising an essentially rigid U-shaped surround member, two plane end wall members and a closure flap member, said members being assembled together and together defining the stowage space of the container, the end wall members being made of injection molded parts.

In U.S. Pat. No. 4,019,674 a construction is described inter alia in the context of containers, in which a component forming the surround as well as a closure flap is connected to plane end walls. The individual components are pre-manufactured separately and are subsequently interconnected. Polyethylene or polystyrene, both of which are thermoplastic materials, are for example disclosed as material for the end walls, and the component forming the surround may inter alia be composed of a fibre panel, i. e. a fibre reinforced component. However, in the aforesaid an application of the described construction in the aviation industry is in no way contemplated for which reason no mention is made as to how the therefore required strengths may be attained with the simultaneous attainment of a light construction.

In the case of the suitcase described in DE-OS 26 46 247 any component forming the surround may likewise be composed of plastics and be connected to end walls of polystyrene, i. e. once again a thermoplastic material. In that patent specification as well no use of the container described therein is contemplated in the context of aviation industry for which reason no measures for the attainment of the weight and strength parameters required in that context are described or even rendered obvious. Manufacture processes using curing steps are known in the art, for example from the U.S. Pat. No. 3,801,402 or the U.S. Pat. No. 4,683,018, but said references disclose no process steps for attaining an easy to build construction for a stowage container with the strength and weight parameters required for the use in aviation industry.

The use of fibre-based fabrics for construction of articles for fitting out the interior of aircraft is known, e. g. from the U.S. Pat. No. 4,690,851, and so is the use of honeycomb construction material, e. g. from U.S. Pat. No. 4,781,243 or FR-PS 2 563 153. But in this patent specifications no mention is made which special measures or process steps must be taken for the manufacture of lightweight but very strong stowage containers which can be used in aviation industry attaining the required parameters for said use.

So-called overhead stowage compartments are used for example in modern aircraft for the storage of the hand baggage of passengers during the flight. Due to the inertial load applied to the aircraft body during the starting and landing phase or during flights and in emergency situations and the weight of the objects stored in such storage spaces, these overhead storage compartments are subjected to high mechanical stresses. These compartments are accordingly manufactured nowadays mainly from modern fibre composite materials, mainly glass fibre reinforced materials, recently also carbon fibre reinforced materials. The same considerations apply to the trollies used for storing for example the meals for the passengers on board of the aircraft. In principle two different constructions are employed.

The components are either manufactured from plane sandwich components which are assembled by jointing means as known from furniture manufacture to form the stowage container (the panels are cut to size, maybe folded, interconnected by separate elements). Such components for given weights per surface area of the sandwich panels are invariably rendered heavier by the connecting elements. The process is suitable for automatic performance and the elements of the baggage deposit cabinets can readily be standardised. High production reliability is afforded by very accurately defined simple production steps.

According to a second conventional method the components are assembled around a tool from plastics semi-manufactured components such as for example plastics prepregs and lightweight cores. The components are packed into a vacuum bag and cured at elevated temperature and in part also under pressure in autoclaves respectively in an oven. The outer contours of the tool correspond to the eventual internal contours of the baggage storage cabinet. Because of the lack of connecting elements, involving the need to design each of the components to be connected for simple safety, the components constructed according to this process are substantially lighter—a decisive advantage in the aviation industry. However, the process reliability is low and defects arising in the production procedure result in expensive after-treatment costs and an increase in the weight of the components.

The aforesaid advantage is also of special importance in the context of the so-called trollies, i.e. the containers which preferably can travel on casters for the storage of meals or the like which are to be made available during the flight. Reduced weight without loss of strength properties implies a possible increase of the useful load whilst retaining the capability to resist mechanical loads as may arise. As regards the manufacture of the trollies, the facts mentioned in connection with the overhead baggage compartments apply.

The above described methods require complicated manufacturing procedures in order to obtain the desired configuration of the compartment including the end and where applicable intermediate walls. The moulding tools, therefore, are also complex and thus expensive.

In addition to the more labour intensive assembly of the baggage compartments respectively trollies and the need for additional connecting components the risk exists that the aforesaid containers may suffer damage along the connecting regions due to the fine vibrations arising in flight. Particularly in the event of an emergency landing where the stowage containers must stand up to nine times gravitational force this can endanger the passengers or crew members. But already during the assembly and by inappropriate use, constructions having more components suffer the risk of being damaged.

OBJECTS OF THE INVENTION

Accordingly it was an object of the invention to provide a process of manufacturing a stowage container of the types referred to in the introduction in such a manner that in spite of simple and economical manufacture and low inherent weight it is adapted to resist reliably the high mechanical loads arising during normal flight and in emergencies and that it avoids all the above-mentioned drawbacks.

SUMMARY OF THE INVENTION

For attaining the aforesaid object a process is provided comprising the steps of: preparing at least two layers of prepregs impregnated with a curable thermosettings for forming the top, bottom and side wall members or the U-shaped surround, interposing between at least two of said layers of prepregs a honeycomb construction material in a manner that said honeycomb construction material is separated in several regions somewhat spaced apart from each other region of honeycomb material, thereby defining folding or bending regions between the regions of honeycomb material, bending or folding the layers of prepregs by applying them over a mould, curing the layers of prepregs in an autoclave by heat application to cured composite component, preparing separately the plane end wall members, and connecting said end wall members unreleasably with the cured composite component to form the final stowage container.

In another mode of the process at least two layers of prepregs impregnated with a curable thermosettings for forming the top, bottom and side wall members or the U-shaped surround and additionally two separate prepregs forming finally the plane end wall members are prepared, followed by steps of interposing between at least two of said layers of prepregs a honeycomb construction material. For at least the prepreg forming the top, bottom and side wall members or the U-shaped surround this is made in a manner that said honeycomb construction material is separated in several regions somewhat spaced apart from each other region of honeycomb material, thereby defining folding or bending regions between the regions of honeycomb material, bending or folding the layers of prepregs by applying them over a mould. The prepregs for forming the plane end wall members are additionally applied to the mould and edge regions thereof are applied over adjacent edge regions of the first prepregs in overlapping manner. This is followed by curing all of the prepregs in an autoclave by heat application to a single-piece, monolithic cured composite component, whereby an unreleasable connection between all wall members of the cured composite component is achieved. All other required components, e.g. casters, wheels, grips, or the like, may be subsequently connected with the container by adhesive bonding, screwing, riveting or welding together. Connecting elements or regions for receiving such parts can also be provided or worked out in the prepregs before curing them. These known and proven manufacturing methods ensure the simple and yet reliable manufacture of the stowage container with the required strength and weight properties for aviation industry. The separate manufacture of some of the individual components of the container allows the selection of the most suitable, most reliable and most cost-effective manufacturing mode for said components, whilst the required mechanical strength parameters are ensured by the choice of material in combination with the special arrangement and connection of the elements.

With the above described above-described processes a rigid single-piece container structure can be produced by means of simple process steps in economic manner. The final product has very good strength values and load bearing parameters while having low weight which is absolutely necessary for the use in modern aircraft. The individual components have relatively uncomplicated configurations which can be pre-manufactured in a simple and inexpensive plant. Interconnecting elements which might give rise to damage in operation are avoided to an extent as great as possible, so that the overall weight of a yet very strong container is considerably reduced.

Moreover, even the mould for applying thereon all pre-manufactured components can be of very simple design and need not be integrated into a complicated apparatus for the moulding of plastics components in one piece. This as well substantially contributes to the economics and simplicity of the manufacturing process according to the invention.

If required, the curing of the layers of prepregs can be achieved by heat application and under pressure, whereby an even more stable construction is guaranteed.

The plane end wall members could, in an easy and economic manner, be manufactured separately by injection molding of thermoplastic material; and to attain a strong and durable connection with the other wall members or the U-shaped surround of the container, an additional step could be provided for applying at least one additional prepreg over at least the region adjoining the side edges of the prepreg forming the top, bottom and side wall members and curing the complete arrangement, whereby a connection between the cured composite component and the end walls is produced.

In a similar manner, the manufacture of plane intermediate wall members by injection molding of thermoplastic material and the connection of said intermediate wall members with the cured composite component at at least one location between the plane end wall members could be provided. Thereby, the inner space of the container is parted in at least two separately usable compartments and the container gains more mechanical strength and rigidity.

For achieving a secure connection between the plane end wall members and/or the intermediate wall members a step could be provided for injection molding connecting means on the plane end wall members and/or the intermediate wall members as part thereof during their manufacture and bonding corresponding connecting means onto the cured composite component during the curing action.

The final and ready-to-use stowage container must be able to be closed and for this purpose the closure flap member is provided by an additional step of manufacturing separately said essentially rigid closure flap member and connecting said member with the cured composite component after the curing action, which closure flap member is preferably prepared by providing at least two prepregs pre-impregnated with a curable thermosettings, interposing between at least two of said prepregs a honeycomb construction material and curing said arrangement by at least heat application.

For the purpose of being able to get the cured composite component off the mould more easily and for being able to manufacture containers which have a smaller width at their open side than at the opposite side, a mode of the above described process is provided, comprising curing the prepregs in a manner such that one of the wall members or a region of the U-shaped surround is maintained in spaced relationship to the edges of the plane end wall members.

To attain the desired and required rigid final construction the further step of bending or folding said one region or wall member of the cured composite component towards the center of the container and connecting its lateral edges with the edges of the plane end wall members - by screwing, adhesive bonding or the like methods—is provided.

BRIEF DESCRIPTION OF THE DRAWINGS

In the following description four stowage containers are to be further explained in more detail with reference to the accompanying drawings. The latter show in FIG. 1 a diagrammatic view of an overhead stowage compartment in an aircraft body,

FIG. 3 a diagrammatic view of a prepreg for the bent or folded component and the application thereof onto a mould, FIG. 4a a diagrammatic view of the condition prior to the application of pre-manufactured components onto a mould, FIG. 4b the removal of the assembled fully cured plastics stowage container, FIG. 5a and 5b, cross-sectional views for advantageous embodiments for interconnecting the components of the container according to the invention.

DESCRIPTION OF SPECIFIC EMBODIMENTS

The following is to be read against the background of the above general description of the invention.

Figure 1:
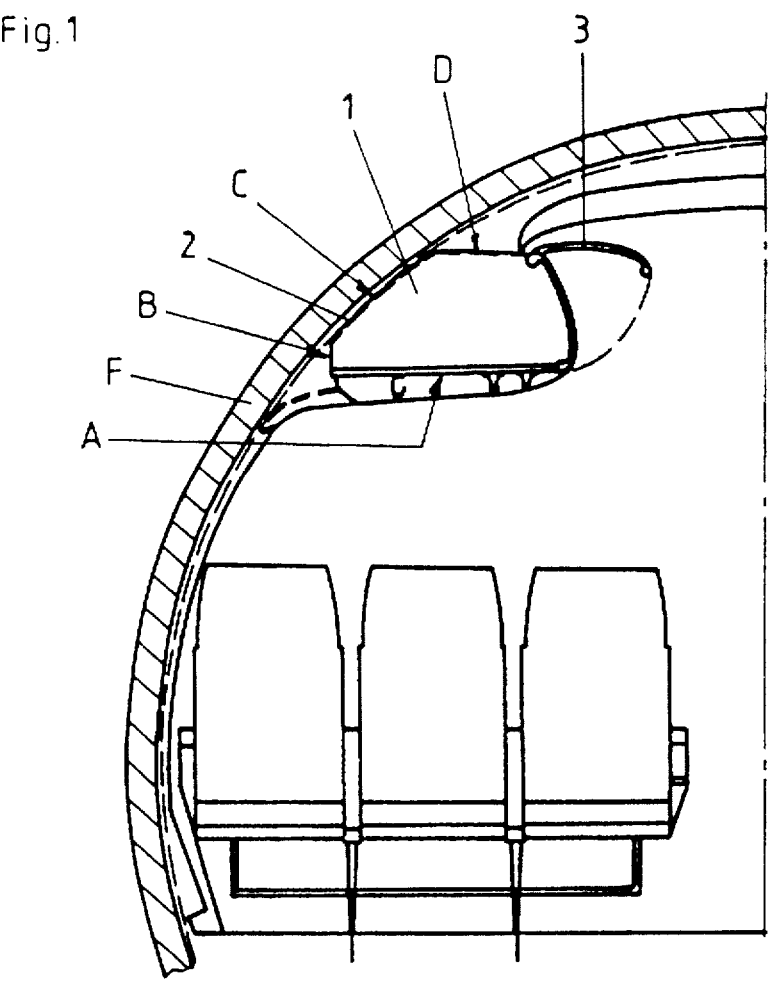

FIG. 1 represents, as an example for a plastics container constructed and manufactured in accordance with the invention, an overhead baggage compartment for aircrat. The baggage compartment fixed to the inside of the walls F of the aircraft body comprises plane end walls 1 and a simply or multiply bent or folded component 2 which forms by way of its side A the bottom, its sides B and C the rear wall and its side D the upper region of the baggage compartment. The component 2 may advantageously be provided with openings 2' (see FIG. 5a) which can be closed by flaps, through which the region between the inner wall F of the aircraft body and rear wall of the baggage compartment and the electrical or hydraulic lines accommodated therein are rendered accessible for maintenance and repair purposes. On that side which faces the passenger space the baggage compartment can be closed by a closure flap 3 which may be of arcuate or sharply bent configuration. Optionally an intermediate wall (not illustrated) can be provided between the respective end walls 1 of a baggage compartment.

Figure 2:
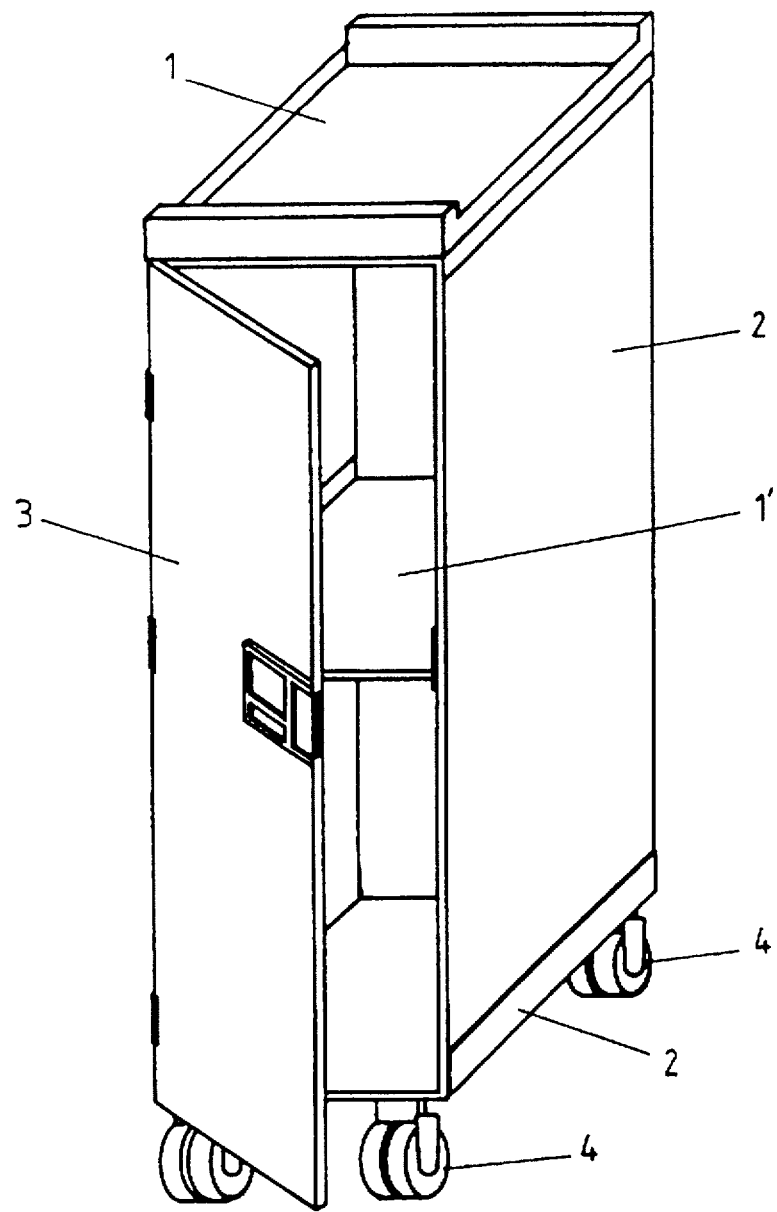
FIG. 2 a trolley.

As a second example for a plastics container constructed and manufactured in accordance with the invention, a so-called trolley is illustrated in FIG. 2. This container serves for example to accommodate the meals for flight passengers on trays and to take these onboard where they are kept for use, whereafter the empty trays are again accommodated and in turn are taken offboard. A trolley as well comprises plane walls 1 which in this case represent the bottom and upper side, a multiply folded component 2 forming three of the four side walls, as well as a door 3 which corresponds to the closure flap of the aforedescribed overhead baggage compartment. In trollies as well intermediate walls 1' can be provided. Handles (not illustrated) can be provided on the sides for handling and transport and rollers 4 can be provided on the underside.

In accordance with the invention the aforesaid bent respectively folded component 2 is a composite component, preferably a glass fibres or carbon fibre reinforced material and is preferably manufactured as a sandwich structure. In the preferred embodiment, for purposes of ease of manufacture and strength of the plastics container, the aforesaid composite component 2 is manufactured of prepregs 6 and comprises regions composed of honeycomb structural material 7 (see FIG. 3). The honeycomb structural materials which ensure the structural strength of the plastics container, for example conventional honeycomb materials, are preferably slightly spaced apart in order to permit the desired shaping of the composite component 2 during the manufacturing process.

For the connection of connecting components, for example fittings, hanger formations, support formations, fastening members for wheels or casters 4 to the basic body of the respective plastic container, it is possible to employ adhesive bonding, screw connecting, riveting or connecting these connection components by injection moulding simultaneously with or onto the composite component 2 or the end walls 1. Whereas the modifications of screw connecting and riveting provide connections which can better resist shear loading, an adhesive bonding or simultaneous or subsequent injection moulding provides the advantage that additional components and additional weight can be saved. The latter advantage also results if the closure flap 3 and the component 2 forming the side walls of the trolley or the surround of the baggage compartment are manufactured in one piece, a thin region of material being provided between this component 2 and the flap 3 or a gap between regions with honeycomb material 7 in order to provide movability of the closure flap 3 in relation to the component 2.

Figure 4A:
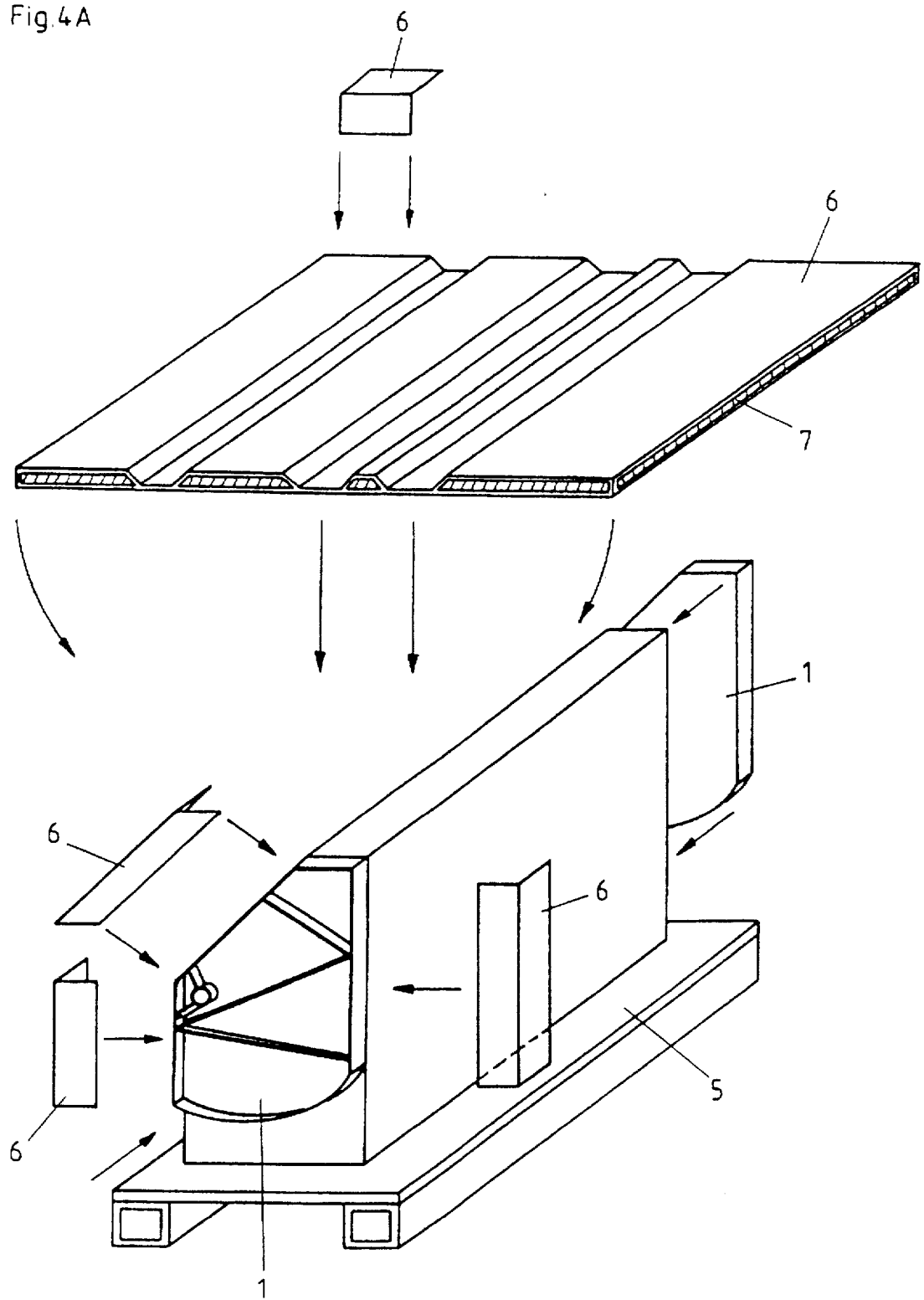
Figure 4B:
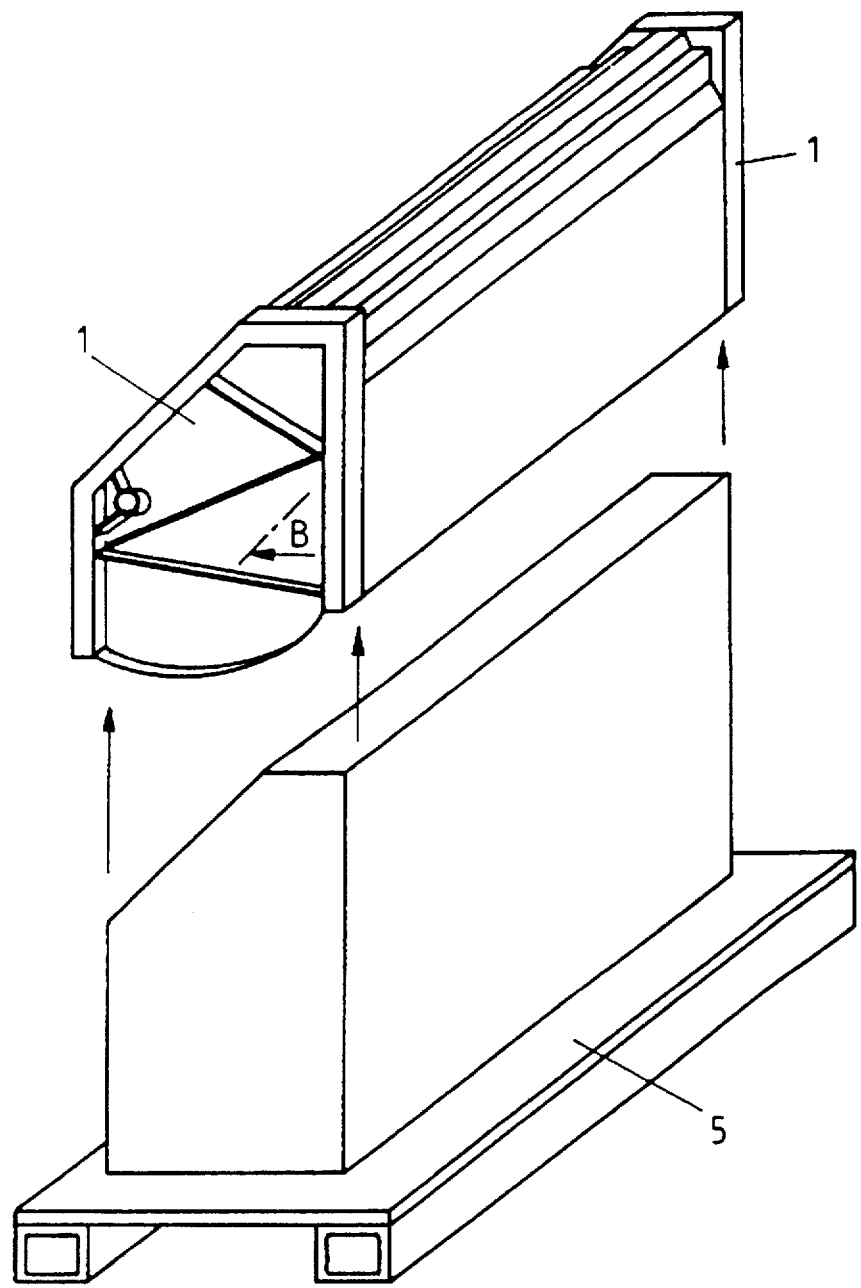

Two preferred manufacturing processes for the aforedescribed plastics containers will be described in the following in conjunction with FIGS. 3 and 4.

According to the first process it is provided that the plane end walls 1 and where applicable the intermediate walls are injection molded for which purpose preferably thermoplastic material is used and that the bent or folded composite component 2 and where applicable also the closure flap or door 3 are separately pre-manufactured. Subsequently all components are interconnected by adhesive bonding, screwing, riveting or welding. The preferred embodiment and manufacturing method for the bent or folded component 2 is diagrammatically illustrated in FIG. 3. The closure flap or door 3 as well could be manufactured according to this manufacturing procedure if it is to be of bent or arcuate design. As illustrated a prepreg 6 is prepared wherein preferably regions of honeycomb structural materials 7 are provided which afford the required structural rigidity of the final component. This prepreg 6 is applied onto a negative mould 5, the configuration of which corresponds to the inner dimensions of the plastics container, gaps or regions of thinner material between the honeycomb material regions 7 serving to facilitate moulding the prepreg 6 about the negative mould 5. The prepreg 6 is fixed to the negative mould in a conventional manner, for example with the aid of a vacuum bag and is subsequently cured in an autoclave by heat application, optionally under pressure.

Instead of the separate manufacture of the composite component 2, including the curing thereof, a second manufacturing process according to the invention provides that all components forming the plastics container are applied onto a negative mould 5 in a predetermined arrangement, are fixed in a conventional manner and are cured in an autoclave by heat application, optionally also with pressure. This modification is illustrated in FIG. 4a where it will be seen that the plane end walls 1 injection molded of thermoplastic material as well as the prepreg 6 for the composite component 2, once again advantageously involving the use of honeycomb materials 7 are applied onto the negative mould 5. The fixation of the components proceeds in a conventional manner, for example by a vacuum bag. After the curing in the autoclave the completed plastics container comprising the plane end walls 1, optionally intermediate walls (not illustrated) and the bent or folded composite component 2 are stripped in one piece off the mould and are subjected to finishing treatment, for example appropriate colouring.

In order to obviate the use of additional components the interconnection of the components proceeds exclusively by the adhesive bonding respectively welding together of the components resulting from the curing action.

Advantageously the components 1 which are preferably injection molded of thermoplastic material already have connecting members, such as, for example, fittings, brackets for the subsequent application to the aircraft body, and support means or trimmings applied thereto in the course of manufacture in the same procedure by injection moulding. Components serving for the interconnection of the components 2 and 3 may also already be provided on the bent component 2 and/or the closure flap 3. Thus, for example one part of a hinge can be applied to the component 2 or the closure flap 3 prior to the assembly and be provided with a connecting member to be fitted to the adjoining component. It is also possible to apply between certain connecting members, for example hinge members of the closure flap 3 and the bent component 2 an adhesive film, a liquid adhesive or the like in order to provide the interconnection of these components in the course of subsequent curing.

Figure 5B:
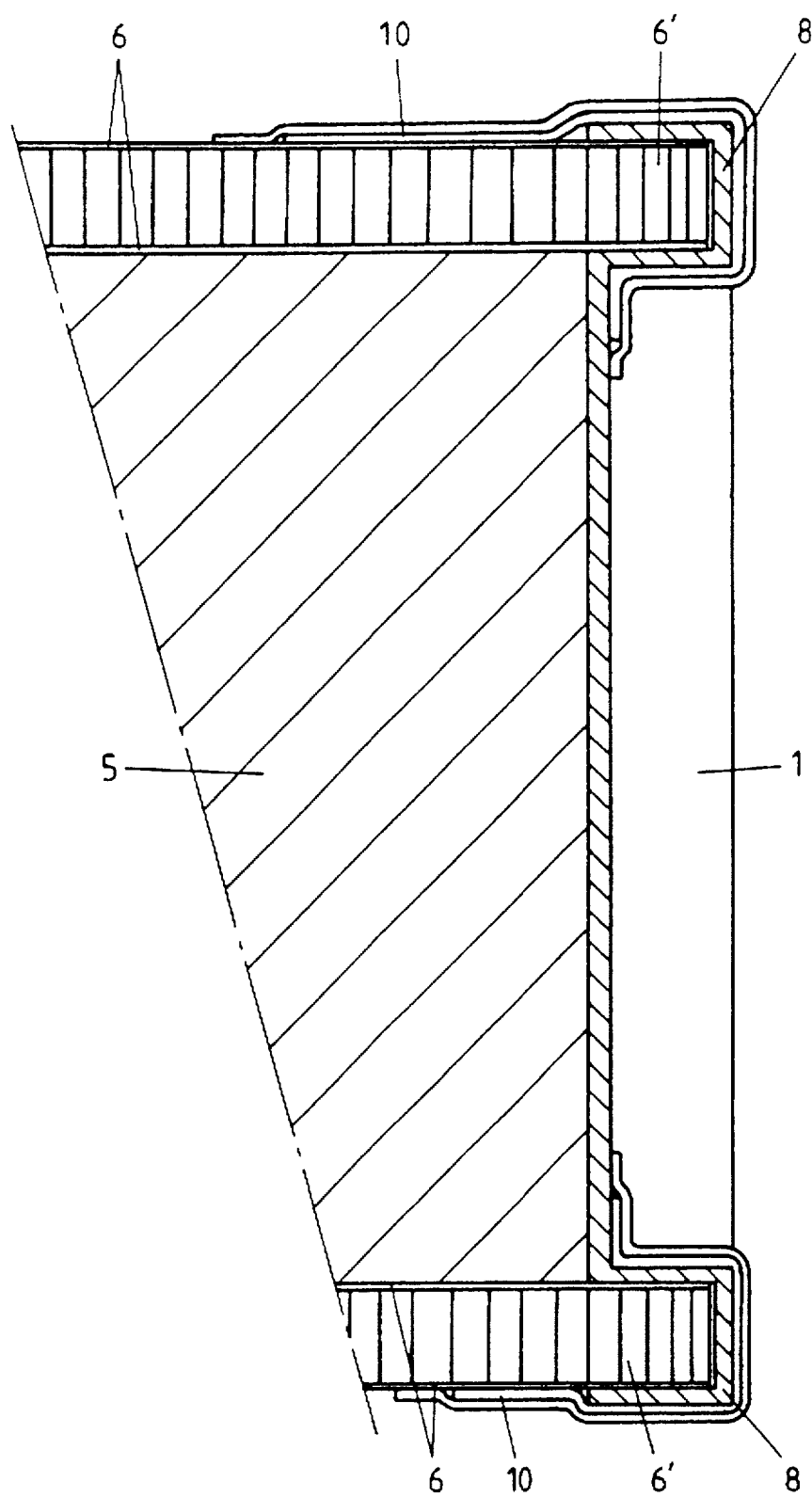

In conclusion the advantageous modifications illustrated in FIGS. 5a and 5b for the interconnection of the folded respectively bent component 2 to the plane end walls 1 are to be dealt with. In the upper half of FIG. 5a it is shown how a lateral edge 2' of the bent or folded composite component 2 is inserted into a U-shaped flange 8 on the outer edge of the plane end wall 1. If the components are appropriately designed this results in a kind of plug-in connection which adequately fixes the components 1 and 2 brought together even prior to their final interconnection thereby substantially facilitating their further handling and processing. Thus, in the optimal case no additional fixing elements need, for example, be used during the fitting onto a negative mould 5.

In the lower half of FIG. 5a a modification for the final connection of the end wall 1 to the composite component 2 is illustrated in which a screw, rivet or the like 9 takes care of the final connection. Such a connection is particularly load resistant, since the screw or rivet 9 is only subjected to shear loading. As can likewise be seen from FIG. 5a the aforesaid screw or rivet 9 passes through the flange 8 of the end wall 1 and the edge 2' of the composite component 2, parallel to the end wall 1, but outside of its plane and in particular outside the interior of the completed plastics container. Apart from the advantage that such a screw connection of three parallel successive layers can be produced easily, the interior of the plastics container can be kept free of projecting parts of the fastener elements used, for example the screw 9.

It stands to reason that, to obviate the screw, rivet or the like 9, a connection may also be brought about purely by adhesive or welding action in the modification illustrated in FIG. 5a as well. A particularly preferred working example of such a connection is illustrated in FIG. 5b. Here as well the plane end wall 1 is provided with U-shaped flanges 8 along its circumferential edge, these flanges 8 only accommodating the lateral edges 6' of the prepreg 6 for the component 2. Such prepreg 6 would then be applied onto the negative mould 5 prior to fitting the end wall, the respective dimensions being so selected that the side edges 6' project somewhat beyond the negative mould 5, so that the inner surface of the end walls 1 is in complete contact against the outer side wall of the negative mould 5 after the application and insertion of the side edges 6' into the flanges 8. In order to improve the stability and the connection between the end wall 1 and the prepreg 6, a further prepreg 10 is used which preferably prior to the curing of the components is layed over at least the region adjoining the side edges 6' of the prepreg 6 and the outside of the end walls 1, respectively, where applicable over the outside of the flanges 8 thereof and is cured jointly with the remaining components. In this context the prepreg 10 may be limited to the region which directly adjoins the side edges 6', a corresponding prepreg being likewise provided on the oppositely disposed side edge, or alternatively a prepreg 10 may be provided extending over the entire width of the prepreg 6. Any desired intermediate between the aforegoing possibilities may be employed.

The end wall 1 is firmly bonded between the side edges 6' of the prepreg 6 and the prepreg 10 by the joint curing action, and in this manner a secure connection is provided between the component 2 prepared from the prepreg 6 and the end walls 1.

Finally, it should be mentioned that obviously alternative forms of flanges 8 are also conceivable. In particular, in the processes employing a negative mould 5, in which the prepreg 6 respectively a pre-manufactured composite component 2 is supported, it is possible for the flange to be formed solely by a folded over part, directed towards the component 2 or the prepreg 6 and embracing the outside of the latter. As regards the mutual interconnection the teachings of the preceding paragraphs apply.

Figure 6:
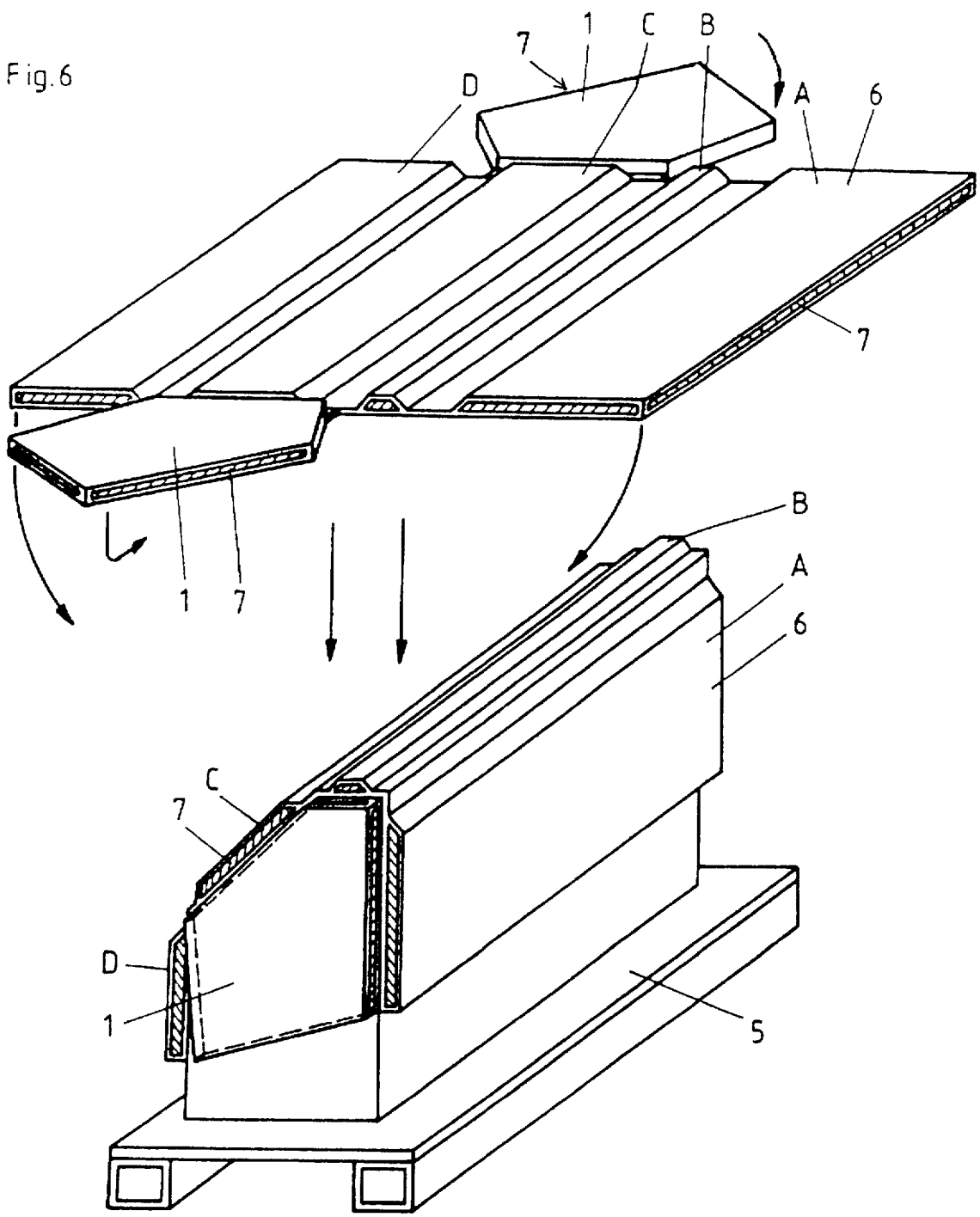
FIG. 6 and 6A are embodiments of a diagrammatic view of a prepreg for the bent or folded component with additional separate prepregs forming afterwards the plane end wall members and the application of said prepregs onto a mould, FIG. 7 the removal of the assembled fully cured plastics stowage container made of the prepreg arrangement according FIG. 6, FIG. 8 a diagrammatic view of a prepreg for a U-shaped surround with additional separate prepregs forming afterwards the plane end wall members and the application of said prepregs onto a mould, and FIG. 9 the removal of the assembled fully cured plastics stowage container made of the prepreg arrangement according FIG. 8.

For a single-piece container again a prepreg 6 is prepared wherein regions of honeycomb structural materials 7 are provided which afford the required structural rigidity of the final component. But now in addition to the prepreg 6—as shown in FIG. 6—separately pre-manufactured prepregs are provided which are designated to form the plane end wall members 1 of the final container. Said prepregs may also be provided with regions of honeycomb structural materials 7 to give them the required rigidity and said regions are preferably spaced apart from the edges of the separate prepregs to allow a bending of said edge regions 1' of the prepreg over the adjacent edge regions of the prepreg 6. To provide enough width for overlapping the adjacent edge regions of the prepreg 6 the additional prepregs are made considerably larger than the desired area of the plane end walls of the final container must have.

The prepreg 6 is applied to a mould 5 as already described in FIG. 3 under bending or folding of the prepreg. Then the additional prepregs are applied to the mould 5, too. The edge regions 1' of the prepregs forming the plane end wall members 1 are bent over the adjacent edge regions of the prepreg 6 and are made to overlap said edge regions a certain distance. Because of the bonding effect of the impregnating resin the prepregs stick to each other and are held together on the mould 5. Advantageously, additional tools such as mould plates can be provided for holding the prepregs to the mould and for pressing them onto the mould in the desired configuration.

Figure 7:
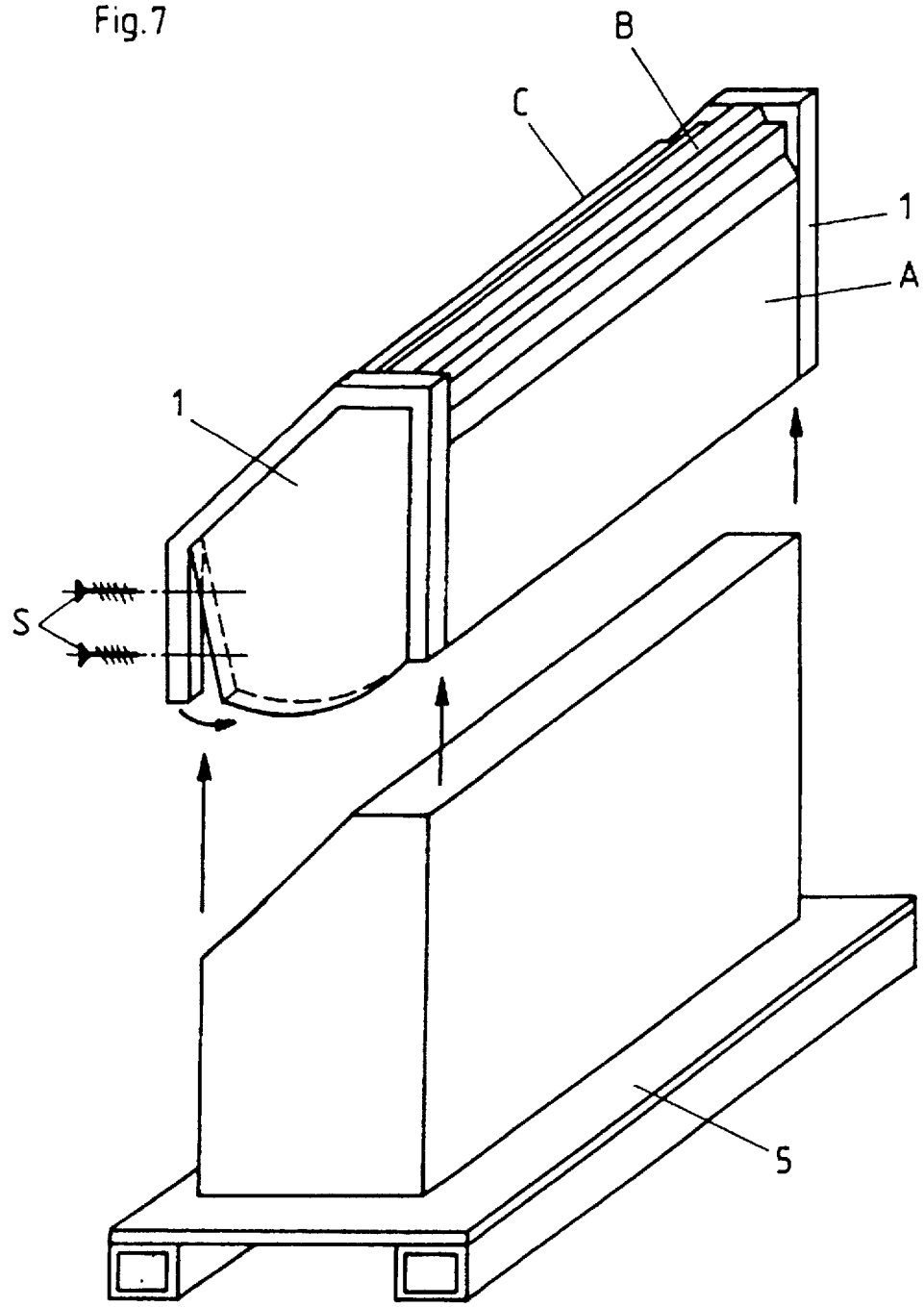

By the following curing step, the prepregs 6 and the additional prepregs for the plane end wall members 1 are unreleasably connected together and said parts then form a unitary, monolithic structure. After curing of the prepregs to the rigid, strong and lightweight single piece component 2 in a process as previously described in conjunction with FIGS. 3 and 4 said component 2 is removed from the mould 5 in a state as shown in FIG. 7.

In embodiments where the container has less width at its open end than on the opposite closed end, a variation of the described single-piece construction is used. The container is cured in a manner that one of the wall members is not connected fixedly with all of the adjacent wall members, such that the container opens up in the direction towards its open end and for this reason the cured composite component 2 can easily be removed from the mould 5—as depicted in FIG. 7. In the shown embodiment, for example, a gap remains between the top wall member D and the adjacent plane end wall members 1, which gap gets smaller from the open end—later on closed by the closure flap member 3—of the container towards the connection region of the top wall member D and the adjacent side wall members 1. Even after curing the "free-ending" wall member D can be bent or folded a small angle towards the adjacent wall members and is then connected with said wall members by any appropriate known manner. Preferably connecting elements such as screws or adhesive bonding for connecting the wall members to bring the container into its final form is provided, and reinforcing layers of fibre reinforced strips my be provided at the connecting regions.

Figure 8:
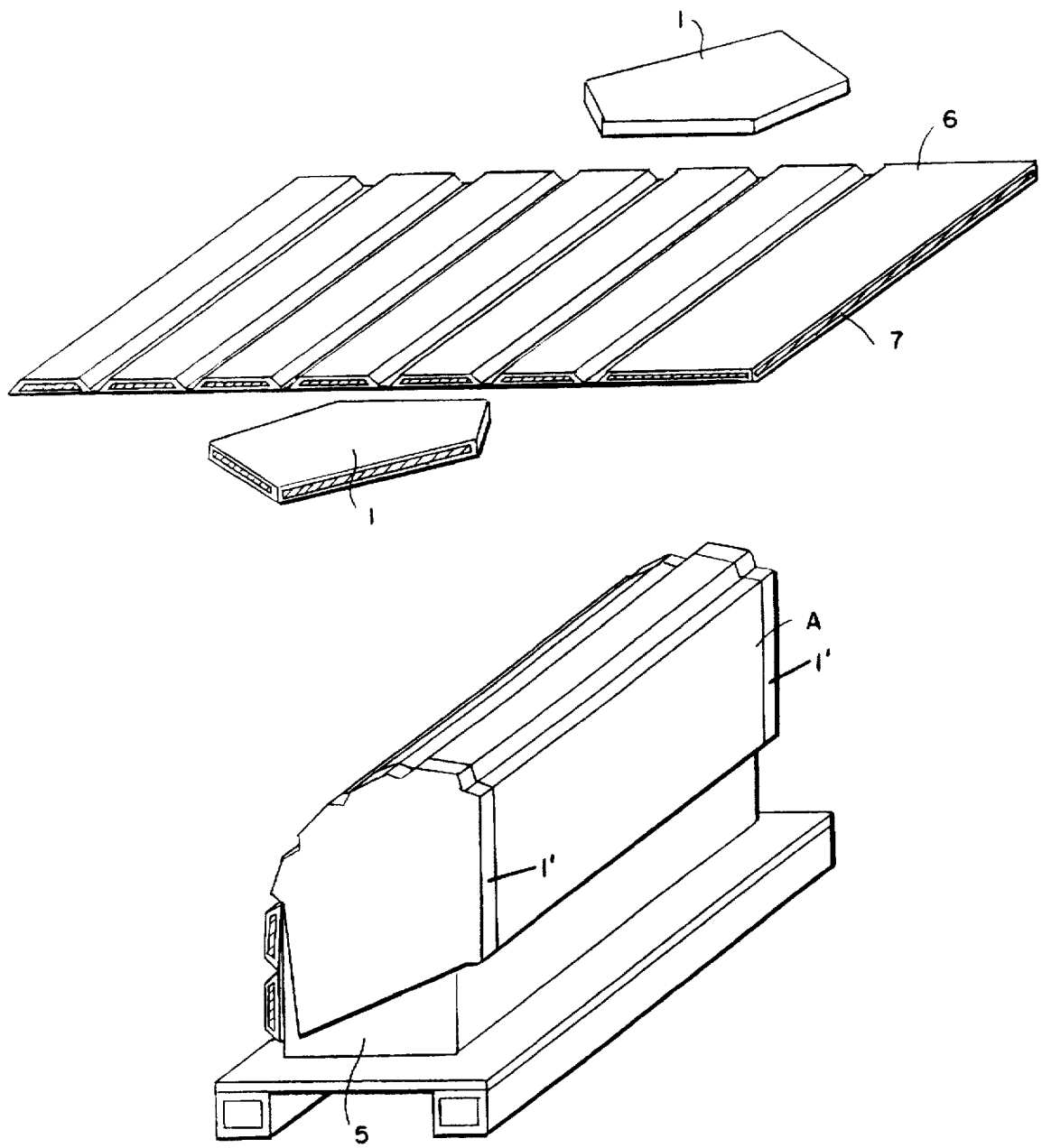
Figure 9:
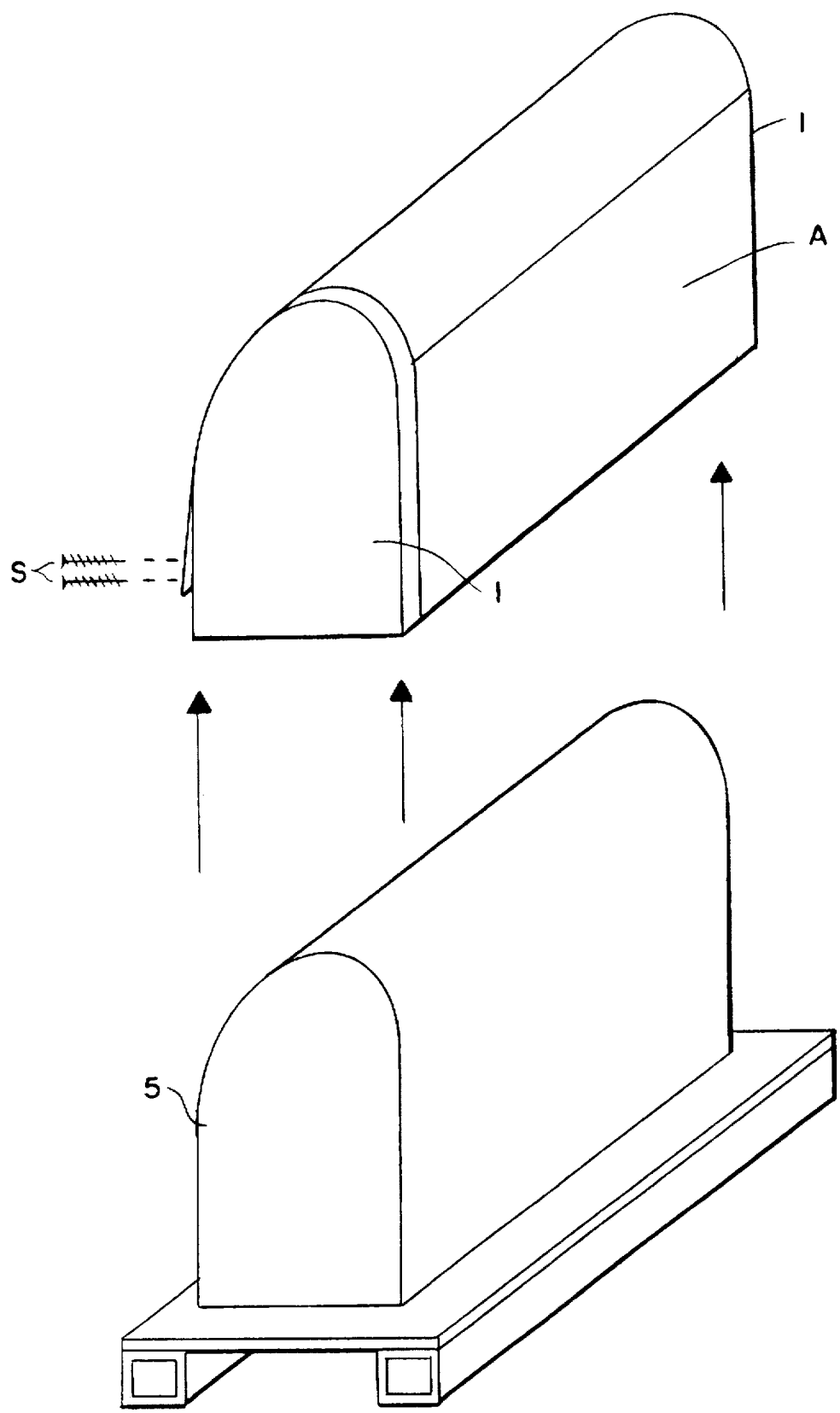

In FIG. 8 and 9 an embodiment of the process is shown for the manufacture of an essentially U-shaped surround. Here—an as shown in FIG. 8, upper part—a prepreg 6 is prepared with several regions of honeycomb construction material 7. Said regions are held smaller in their dimensions than in the previously described embodiment and there are more of them. By applying said prepreg of FIG. 8 to a mould 5 with a smoothly rounded outer surface the prepreg 6 is also smoothly bent at the intermediate regions between the regions with honeycomb material and such an essentially round configuration can be achieved.

Again said prepreg 6, and if provided separate prepregs for forming the plane end wall members 1 with overlapping regions 1', are cured as described above to form a monolithic cured composite component in the form of a U-shaped surround, preferably with integrally connected plane end wall members of additional pre-fabricated prepregs.

Figure 6A:
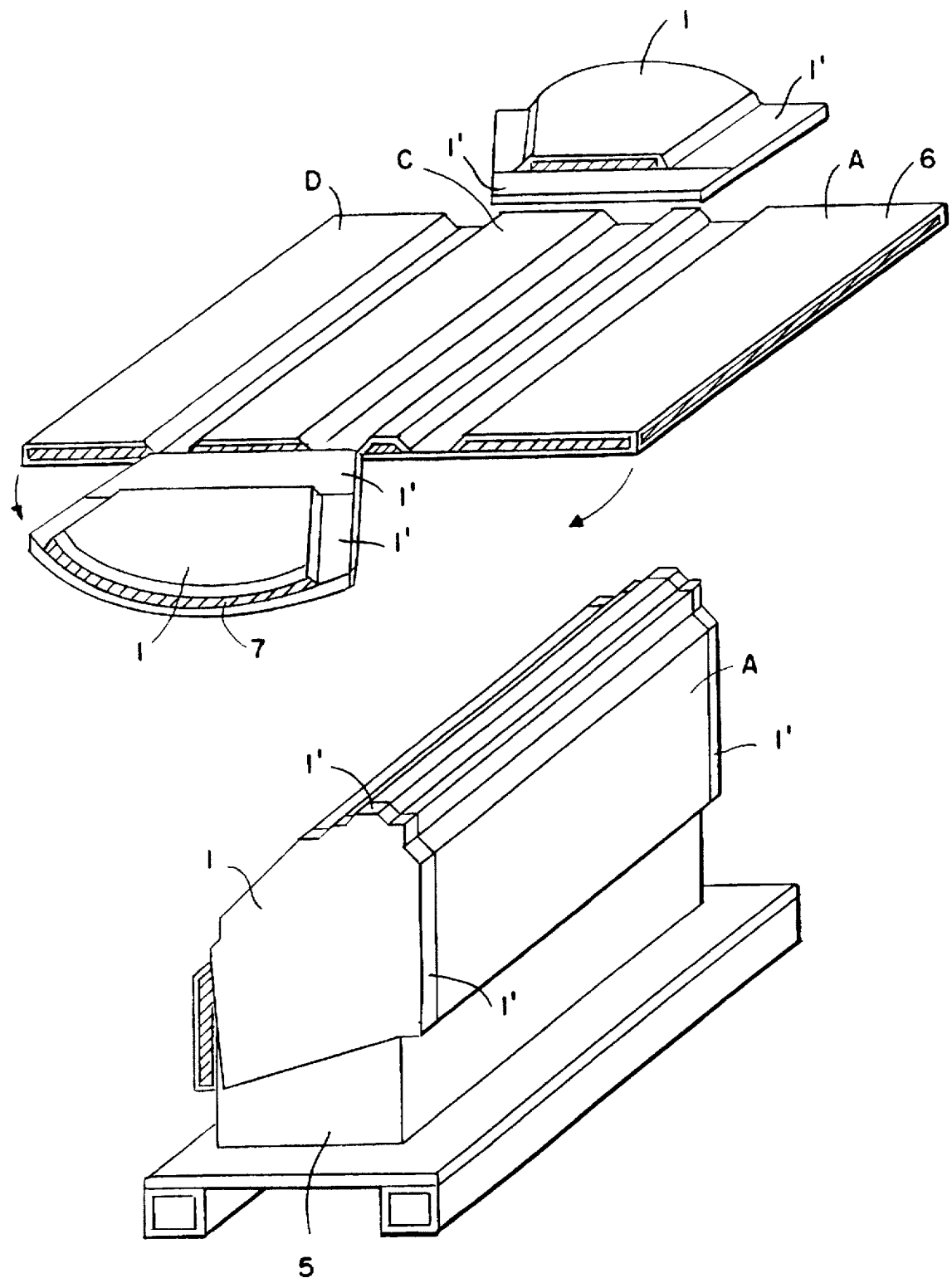

In the upper part of FIG. 6A the two "flaps" forming later on the plane end wall members—designated with numeral 1—can be separate prepreg parts at first. Therefore, at the transition region between the part of the prepreg 6 forming the top, side and bottom wall members (extending in a straight line from the left to the right in the drawing) the honeycomb material—between the upper and lower prepreg layers—can still be seen at the "free" edges of prepreg 6. At the mould, the prepreg 6 is bent around said tool and the prepreg parts 1 for the plane end wall members are applied onto said mould, too. They are large enough that their edges overlap the edge regions of the adjacent regions of the prepreg 6 and at this stage cover said edge regions and the honeycomb material can no longer be seen. The latter stage of the manufacturing process is shown in the lower part of FIG. 6. In this figure the honeycomb material can not be seen anywhere because it is covered by the overlapping edge regions of the former separate parts 1 of the prepreg 6.

The U-shaped surround in principle shows the same features as the already described and depicted embodiment of the container. The only difference is that there are more honeycomb regions and that the prepreg is not sharply folded in the intermediate regions between said honeycomb regions but is smoothly bent to form an essentially continuous round wall.

The assembly remains the same as with the first described embodiment, including the special attachment of the plane end wall members as at first separate and then—after the curing step—integrally connected regions of the container.

I claim:

1. A process for manufacturing an aircraft stowage container, the stowage container comprising a composite component, the composite component being an essentially rigid U-shaped surround member or a bottom member, a top member, and at least two side wall members, the bottom, top, and side wall members being essentially rigid and flat, the stowage container further comprising two essentially rigid and flat end wall members, the process comprising the steps of:

(a) preparing at least two layers of prepregs impregnated with a curable thermosetting material for forming the U-shaped surround member or the top, bottom, and side wall members, (b) interposing between at least two of the layers of prepregs spaced-apart regions of honeycomb construction material with intermediate regions between the spaced-apart regions of honeycomb construction material, the intermediate regions defining folding or bending regions between the spaced-apart regions of honeycomb construction material, (c) bending or folding the layers of prepregs at at least some of the intermediate regions by applying the layers of prepregs over a mould to form an uncured composite component, (d) connecting the end wall members with the uncured composite component, wherein a corner is formed by connecting the end wall member with the uncured composite component, the corner including a region where the end wall member touches the uncured composite component, (e) applying at least one additional layer of prepregs directly to the end wall member and to the uncured composite component with a portion of the at least one additional layer being bent around the corner, and (f) curing at least the uncured composite component and the additional layer of prepregs with the end wall member in an autoclave by heat application, whereby the resulting stowage container is capable of withstanding up to nine times gravitational force.

2. A process according to claim 1, wherein the curing in the autoclave in step (f) is by heat application and under pressure.

3. A process according to claim 1, comprising the further step of manufacturing the end wall members separately by injection molding of thermoplastic material.

4. A process according to claim 1, comprising additionally the steps of manufacturing a plane intermediate wall member by injection molding of thermoplastic material, and connecting the intermediate wall member with the cured composite component at at least one location between the end wall members.

5. A process according to claim 4, wherein the step of manufacturing a plane intermediate wall member further comprises manufacturing a connecting means on the intermediate wall member.

6. A process according to claim 1, wherein the end wall members have connecting means, and wherein corresponding connecting means are bonded onto the composite component during step (f).

7. A process according to claim 1, comprising the additional step of connecting an essentially rigid closure flap with the cured composite component.

8. A process according to claim 7, wherein the closure flap is manufactured by preparing at least two layers of prepregs impregnated with a curable thermosetting material, interposing between at least two of the layers of prepregs a honeycomb construction material, and forming the closure flap by curing the resulting layers of prepregs with the honeycomb construction material by at least heat application.

9. A process as claimed in claim 1, wherein step (f) is performed after steps (c) and (d).

10. A process for manufacturing an aircraft stowage container, the stowage container comprising a composite component, the composite component being an essentially rigid U-shaped surround member or a bottom member, a top member, and at least two side wall members, the bottom, top, and side wall members being essentially rigid and flat, the stowage container further comprising two essentially rigid and flat end wall members, the process comprising the steps of:

(a) preparing at least two layers of prepregs impregnated with a curable thermosetting material for forming the U-shaped surround member or the top, bottom, and side wall members, (b) preparing at least two layers of prepregs for forming the end wall members, (c) interposing between at least two of the layers of prepregs form step (a) spaced-apart regions of honeycomb construction material with intermediate regions between the spaced-apart regions of honeycomb construction material, the intermediate regions defining folding or bending regions between the spaced-apart regions of honeycomb construction material, (d) interposing between at least two of the layers of prepregs from step (b) honeycomb construction material, (e) applying the layers of prepregs from steps (b) and (d) over a mould to form the end wall members with edges, applying the layers from steps (a) and (c) over the mould and bending or folding the layers of prepregs from steps (a) and (c) at at least some of the intermediate regions to form an uncured composite component with side edges, the edges of the end wall members overlapping adjacent side edges of the uncured composite component, wherein a corner is formed, the corner including a region where the end wall member touches the uncured composite component, (f) applying at least one additional layer of prepregs directly to the end wall member and to the uncured composite component with a portion of the at least one additional layer being bent around the corner, and (g) after step (f), curing the end wall members, the uncured composite component and the additional layer of prepregs in an autoclave by heat application, whereby an unreleasable connection between the end wall members and the composite component is achieved and the resulting stowage container is capable of withstanding up to nine times gravitational force.

11. A process according to claim 10, wherein the curing in the autoclave in step (g) is by heat application and under pressure.

12. A process according to claim 10, wherein the curing in step (g) results in one of the bottom, top, or side wall members or one region of the U-shaped surround member being maintained in spaced relationship to the edges of the end wall members.

13. A process according to claim 12, wherein the one wall member or the one region being maintained in spaced relationship to the edges of the end wall members is bent or folded towards the center of the container and lateral edges of the one wall member or the one region are connected with the edges of the end wall members.

14. A process according to claim 13, wherein the lateral edges of the one wall member or the one region are connected with the edges of the end wall members by screwing.

15. A process according to claim 13, wherein the lateral edges of the one wall member or the one region are connected with the edges of the end wall members by adhesive bonding.

16. A process according to claim 10, comprising additionally the steps of manufacturing a plane intermediate wall member by injection molding of thermoplastic material, and connecting the intermediate wall member with the cured composite component at at least one location between the end wall members.

17. A process according to claim 16, wherein the step of manufacturing a plane intermediate wall member further comprises manufacturing a connecting means on the intermediate wall member.

18. A process according to claim 10, comprising the additional step of connecting an essentially rigid closure flap with the cured composite component.

19. A process according to claim 18, wherein the closure flap is manufactured by preparing at least two layers of prepregs impregnated with a curable thermosetting material, interposing between at least two of the layers of prepregs a honeycomb construction material, and forming the closure flap by curing the resulting layers of prepregs with the honeycomb construction material by at least heat application.

20. A process for manufacturing an aircraft overhead stowage container, the container comprising a bottom member, a top member, and at least two side wall members, the bottom, top, and side wall members being essentially rigid and flat, wherein the bottom, top, and side wall members can be formed by an essentially rigid U-shaped surround member, the container further comprising two essentially rigid and flat end wall members and an essentially rigid closure flap, the process comprising the steps of:

(a) preparing at least two layers of prepregs impregnated with a curable thermosetting material for forming the U-shaped surround member or the top, bottom, and side wall members;

(b) interposing regions of honeycomb construction material between at least two of the layers of prepregs with intermediate regions between the regions of honeycomb construction material, the intermediate regions defining folding or bending regions between the regions of honeycomb construction material;

(c) bending or folding the layers of prepregs at at least some of the intermediate regions by applying the layers of prepregs over a mold to form a composite component with side edges;

(d) preparing separately the end wall members, and applying the end wall members over the mold, wherein a corner is formed, the corner including a region where the end wall member touches the composite component, (e) applying at least one additional layer of prepregs directly to the end wall member and to the composite component with a portion of the at least one additional layer being bent around the corner and over at least a region adjoining the end wall members and the side edges of the composite component; and (f) after step (e), curing the composite component with the end wall members and the at least one additional layer of prepregs in an autoclave by heat application, whereby an unreleasable connection between the composite component and the end wall members is produced and the resulting stowage container is capable of withstanding up to nine times gravitational force.

21. A process for manufacturing an aircraft overhead stowage container, the container comprising a bottom member, a top member, and at least two side wall members, the bottom, top, and side wall members being essentially rigid and flat, wherein the bottom, top, and side wall members can be formed by an essentially rigid U-shaped surround member, the container further comprising two essentially rigid and flat end wall members and an essentially rigid closure flap, the process comprising the steps of:

(a) preparing at least two layers of prepregs impregnated with a curable thermosetting material for forming the U-shaped surround member or the top, bottom, and side wall members;

(b) preparing at least two separate layers of prepregs for forming the end wall members;

(c) interposing between at least two of the layers of prepregs from step (a) regions of honeycomb construction material with intermediate regions between the regions of honeycomb construction material, the intermediate regions defining folding or bending regions between the regions of honeycomb construction material;

(d) interposing between at least two of the layers of prepregs from step (b) honeycomb construction material;

(e) applying the layers of prepregs from steps (b) and (d) over a mold to form the end wall members with edges, applying the layers of prepregs from steps (a) and (c) over the mold and bending or folding the layers of prepregs from steps (a) and (c) at at least some of the intermediate regions to form the composite component with side edges, the edges of the end wall members overlapping adjacent side edges of the composite component, wherein a corner is formed, the corner including a region where the end wall member touches the composite component, (f) applying at least one additional layer of prepregs directly to the end wall member and to the composite component with a portion of the at least one additional layer being bent around the corner; and (g) after step (f), curing the end wall members, the composite component and the additional layer of prepregs in an autoclave by heat application, whereby an unreleasable connection between all of the wall members is achieved and the resulting stowage container is capable of withstanding up to nine times gravitational force.

* * * * *

UNITED STATES PATENT AND TRADEMARK OFFICE
CERTIFICATE OF CORRECTION

PATENT NO. : 5,785,788

DATED : July 28, 1998

INVENTOR(S) : Stephan

It is certified that error appears in the above-identified patent and that said Letters Patent is hereby corrected as shown below:

Column 11, line 41, change "form" to --from--.

Signed and Sealed this

Second Day of March, 1999

Attest:

Q. TODD DICKINSON

*Attesting Officer*  *Acting Commissioner of Patents and Trademarks*